No. 617,797.  
F. W. WUNDERLICH.  
SPROCKET WHEEL FOR BICYCLES.  
(Application filed May 28, 1897. Renewed Apr. 28, 1898.)  
(No Model.)  
Patented Jan. 17, 1899.

Witnesses  
Geo. E. Frech.  
Rosann Smith.

Inventor.  
F. W. Wunderlich  
per Chas. H. Drew,  
Attorney.

THE NORRIS PETERS CO., PHOTO-LITHO., WASHINGTON, D. C.

UNITED STATES PATENT OFFICE.

FRANK W. WUNDERLICH, OF ARLINGTON, MASSACHUSETTS.

SPROCKET-WHEEL FOR BICYCLES.

SPECIFICATION forming part of Letters Patent No. 617,797, dated January 17, 1899.

Application filed May 28, 1897. Renewed April 28, 1898. Serial No. 679,147. (No model.)

*To all whom it may concern:*

Be it known that I, FRANK W. WUNDERLICH, a citizen of the United States, residing at Arlington, county of Middlesex, and State of Massachusetts, have invented a new and useful Improvement in Sprocket-Wheels for Bicycles, of which the following is a specification.

The object of my invention is to obviate the friction which is caused by the use of the ordinary sprocket-wheels. I attain my object by providing on the periphery of each sprocket-wheel, both front and rear, instead of the ordinary points which engage with the sprocket-chain a rotating bearing which itself turns upon a ball-bearing.

Figure 1:
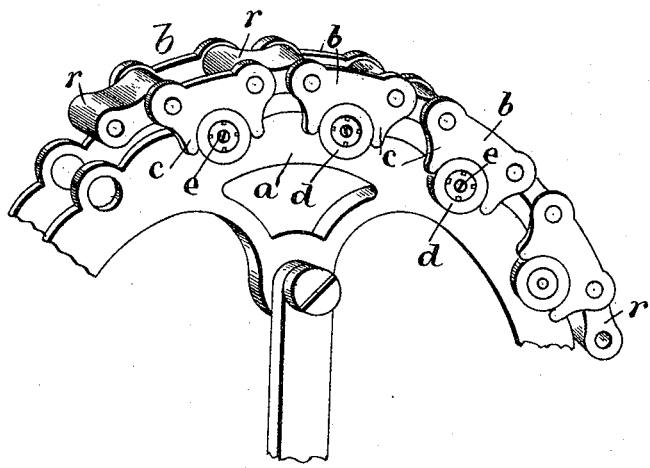
Figure 2:
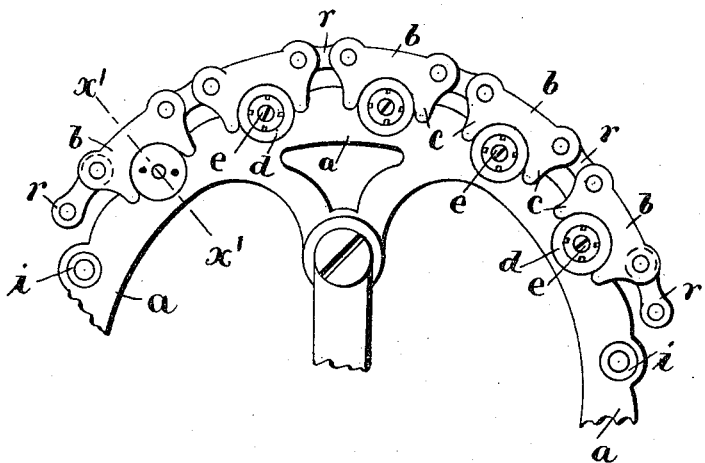
Figure 3:
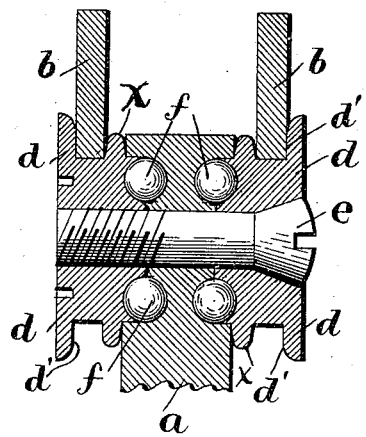

Figure 1 is a perspective view of a sprocket wheel and chain embodying my invention. Fig. 2 is a side elevation of the same. Fig. 3 is a vertical section taken through the bolt *e* of Figs. 1 and 2.

*a* represents the sprocket-wheel, the outer edge of which is formed or shaped as shown in Fig. 1 and which has formed horizontally through it a series of openings *i*, and at each end of these openings is a suitable cup-bearing *d*, in which the balls are placed, as shown in Fig. 2. The bearing-rolls are provided with flanges *d'* and *x* and have their inner ends inserted into the recesses formed in opposite sides of the wheel *a*, as shown, the flanges *x* serving to limit the distance that the bearings shall extend inwardly into the wheel and the flanges *d'* serving to prevent the side links *b* of the chain from slipping off the bearings while in operation. Two sets of balls *f* are used, and two rotating bearings *d*, used in pairs, are employed in connection with each one of the openings *i*, and these rotating bearings are connected by means of the screw-bolt *e*, which passes through them both, as shown.

The sprocket-chain consists of the wide side links *b*, each one of which is provided with link or projection *c*, which straddles down over the bearings *d*, and these links are connected by the central link *r* in the usual manner. The central links *r* are made wider than the edge of the wheel *a*, so that the side links will be held sufficiently far apart to bear only upon the bearing-rolls *d* at all times. As these rotating bearings *d* revolve at the slightest pressure of the side links *b* upon them, it will readily be seen that the grinding or frictional contact of the links upon the wheel is entirely done away with, and hence the wheel can be propelled more readily than has heretofore been possible where the ordinary sprocket chains and wheels are used.

By the construction here shown the bearing-rolls take the place of the ordinary sprocket-wheel and the central links are not brought in contact with the wheel at any time. The consequence is the friction is greatly decreased and the wear and tear upon the wheels are entirely done away with, as the rotating bearings receive the entire contact of the chain.

Having thus described my invention, I claim—

A sprocket-wheel, having a series of openings made horizontally through its rim, the balls and the rotating bearings upon opposite sides of the wheel in pairs, combined with a sprocket-chain, the side links of which bear upon the bearing-rolls, substantially as set forth.

FRANK W. WUNDERLICH.

Witnesses:
EPHM. C. DAVIS,
CHAS. H. DREW.